United States Patent

Fujii et al.

[11] Patent Number: 5,566,709
[45] Date of Patent: Oct. 22, 1996

[54] FLUID PLANT AND ITS OPERATING METHOD

[75] Inventors: Tadashi Fujii, Hitachi; Yoshiyuki Kataoka, Ibaraki-ken; Shoichiro Kinoshita, Hitachi, all of Japan

[73] Assignee: Hitachi, Ltd., Tokyo, Japan

[21] Appl. No.: 77,063

[22] Filed: Jun. 16, 1993

[30] Foreign Application Priority Data

Sep. 18, 1992 [JP] Japan ..................... 4-249482

[51] Int. Cl.$^6$ ..................... F04B 41/06
[52] U.S. Cl. ..................... 137/487.5; 137/567; 417/3; 165/286
[58] Field of Search ..................... 165/70, 34, 40; 137/487.5, 567; 417/3, 4, 5, 6

[56] References Cited

U.S. PATENT DOCUMENTS

| | | | |
|---|---|---|---|
| 3,060,858 | 10/1962 | Shoosmith | 417/3 |
| 3,229,639 | 1/1966 | Hignutt et al. | 417/6 |

FOREIGN PATENT DOCUMENTS 993173  5/1965  United Kingdom ..................... 165/70

*Primary Examiner*—John Rivell
*Attorney, Agent, or Firm*—Antonelli, Terry, Stout & Kraus

[57] ABSTRACT

In a plant equipment comprising apparatus of a plurality of systems and control means for switching the systems and changing capacities of the apparatus, an apparatus of each system has a rated capacity which is 1/N of a capacity of the whole equipment, and the plant equipment is constituted of (N+1) systems. In conditions of normal operation, all the (N+1) systems are operated at capacities less than the rated capacity through the control means. During normal operation, when one system is inspected, or when an abnormality occurs in one system, this system is stopped by the control means. Capacities of apparatus in N of the systems which are operated are increased to the rated 1/N capacity through the control means, and operation is continued with a structure of 1/N capacity×N systems. When the maintenance of apparatus in the stopped system is finished, the stopped system is restarted, so as to operate all of the (N+1) systems at capacities less than the rated capacity again.

6 Claims, 12 Drawing Sheets

FLUID PLANT AND ITS OPERATING METHOD

BACKGROUND OF THE INVENTION

The present invention relates to a fluid plant which comprises a plurality of system apparatus.

In a nuclear power plant containing a fluid such as cooling water, for example, in a normal-use equipment of a conventional boiling water reactor, three systems of condensate system pumps each having a 50% capacity are provided in parallel, as shown in FIGS. 5 and 6, and one of the systems is used as a stand-by system (a spare system). As feed water system pumps, two systems of turbine driven pumps each having a 50% capacity are provided for normal use, and one system of a motor driven pump having a 25% capacity is provided as a stand-by system (a spare system). In the equipment provided with such stand-by system apparatus, when an abnormality occurs in apparatus of one of the systems during normal operation, this system where the abnormality has occurred is firstly stopped, and the systems are switched to start the apparatus of the stand-by system. Thereafter, maintenance inspection of the apparatus in the system where the abnormality has occurred is performed, and also, operation of the plant is continued with the apparatus in the stand-by system and the apparatus of the other normally functioning system, thus preventing operational efficiency and reliability of the equipment from deteriorating.

In a reactor water clean-up system, however, two systems of pumps each having a 50% capacity are only provided for normal use, and no spare pump is provided. Therefore, in the equipment without stand-by system apparatus, when an abnormality occurs in apparatus of one of the systems during operation, the entire plant must be stopped to perform maintenance of the apparatus in question.

In the above-described equipment provided with the stand-by system apparatus, it is necessary to start the stand-by system apparatus quickly at the time of occurrence of an abnormality. Generally, the stand-by system apparatus are in a stopped condition until they receive a start signal produced a result of occurrence of an abnormality. In response to the start signal, power is supplied from an emergency power supply, and operation of the stand-by system apparatus is started. However, a start-up failure probability of a diesel-engine generator serving as the emergency power supply is relatively higher than that of other apparatus, and consequently, it is probable that power supply to the stand-by system apparatus will fail, and that the standby system apparatus can not be started. When starting of the stand-by system apparatus fails, conditions of normal operation can not be quickly recovered in substantially the same manner as the equipment without stand-by system apparatus, thereby deteriorating operational efficiency (availability) of the equipment. Also, maintenance of the apparatus during normal operation can not be conducted, and maintenance efficiency can not be improved.

SUMMARY OF THE INVENTION

A first object of the present invention is to provide a fluid plant comprising a plurality of systems which is suitable for enabling maintenance inspection of apparatus of the systems during normal operation without stopping operation of the plant, and for facilitating operation to deal with an abnormality when it occurs. A second object of the invention is to provide a heat exchanger as a system apparatus which is suitable for achieving the first object.

A first means for achieving the first object is a fluid plant comprising a plurality of systems which are all operated at capacities less than a rated capacity during normal operation, switching means for changing desired systems of the plurality of systems to be operated at the rated capacity, and isolating means for isolating the desired systems of the plurality of systems. A second means for the same purpose is an operating method of a fluid plant, in which a plurality of same systems are operated at capacities less than a rated capacity during normal operation so as to substantially satisfy a required capacity as a plant with a total capacity of all the systems, and when an accident occurs or when maintenance inspection is conducted, a system in which the accident has occurred or for which the maintenance inspection is conducted is isolated from the other systems, the other systems being operated at the rated capacity so as to substantially satisfy the plant required capacity. A third means for the same purpose is a fluid plant comprising a plurality of systems (N+1), each having a rated capacity which is substantially 1/N of a capacity required as a whole, isolating means for each of the systems, and control means for controlling each of the plurality of systems (N+1) to be operated at a capacity less than the rated capacity during normal operation, and controlling N of the systems to be operated at the rated capacity during non-normal operation and changing the capacity of the one other system to be zero. A means for achieving the second object is a heat exchanger of a structure comprising one shell-side path and a plurality of tube-side paths, wherein an outlet nozzle of a fluid on the tube side is provided on a header in which a flow of the tube-side fluid turns reversely.

According to the first means, all the systems are operated at capacities less than the rated capacity and functioned moderately in terms of capacities during normal operation. When an accident occurs or when maintenance inspection is necessary, the system where the accident has occurred or which requires the maintenance inspection is isolated by the isolating means, and the other systems are operated at capacities increased to the rated capacity, so as to continue to satisfy the required capacity. Thus, while the plant is kept operated at the proper capacity, it is possible to take necessary measures with respect to the isolated system.

Also, since all the systems are operated in normal conditions, this plant is different from an equipment including stand-by system apparatus in that it is possible to avoid a start-up failure of the stand-by system apparatus. Further, at the time of inspection or occurrence of an abnormality, the capacities of normal systems can be increased without starting any stand-by system apparatus, and an amount of capacity change to the rated capacity during operation is small, to thereby shorten time required for increasing the capacities. Thus, at the time of inspection or occurrence of an abnormality, the rated operational capacity can be obtained quickly.

According to the second means, all the systems are operated at capacities less than the rated capacity during normal operation so as to substantially satisfy the required capacity as a plant. When an accident occurs or when maintenance inspection is conducted, a system in which the accident has occurred or for which the maintenance inspection is conducted is isolated from the other systems. While the other systems are operated at capacities increased to the rated capacity so as to substantially satisfy the plant required capacity, it is possible to take necessary measures with respect to the system in which the accident has occurred or for which the maintenance inspection is conducted.

Moreover, since all the systems are operated in normal conditions, this plant is different from an equipment including stand-by system apparatus in that it is possible to avoid a start-up failure of the stand-by system apparatus. Furthermore, at the time of inspection or occurrence of an abnormality, the capacities of normal systems can be increased without starting any stand-by system apparatus, and an amount of capacity change to the rated capacity during operation is small, to thereby shorten time required for increasing the capacities. Thus, at the time of inspection or occurrence of an abnormality, the rated operational capacity can be obtained quickly.

According to the third means, each of the systems is operated at a capacity less than the rated capacity which is 1/N of the capacity required as a whole, for instance, operation is performed with a structure of 1/(N+1) capacity× (N+1) systems. During operation, when apparatus in one system are inspected, or when an abnormality occurs in one system, this system is stopped by the control means. Then, the system is isolated by the isolating means. Capacities of N of the systems during operation are increased to 1/N of the required capacity which is the rated capacity through the control means, and operation is continued with a structure of 1/N capacity×N systems, while satisfying the plant required capacity. When the maintenance inspection or accident treatment of the stopped and isolated system is finished, the stopped system is released from the isolated condition and recovers the operating condition, so as to resume operation, for instance, in the original state with the structure of 1/(N+1) capacity×(N+1) systems again. Consequently, conditions of normal operation can be maintained even during non-normal operation, and maintenance inspection and accident treatment can be carried out in normal operation conditions.

Also, since all the systems (N+1) are operated in normal conditions, this plant is different from an equipment including stand-by system apparatus in that it is possible to avoid a start-up failure of the stand-by system apparatus. Further, at the time of inspection or occurrence of an abnormality, the capacities of N of the systems can be increased without starting any stand-by system apparatus, and an amount of capacity change to the rated capacity which is 1/N of the required capacity during operation is small, to thereby shorten time required for increasing the capacities. Thus, at the time of inspection or occurrence of an abnormality, the rated operational capacity can be obtained quickly.

According to the fourth means, the outlet nozzle of the fluid on the tube side is provided on the header in which the glow of the tube-side fluid turns reversely, and the fluid in the tubes during heat exchange can be discharged through this outlet nozzle, so that it is easy to provide a structure which can facilitate change of the heat exchange capacity into the rated capacity or into a capacity less than the rated capacity. If this heat exchanger is used as, for instance, an apparatus in each system of the third means, maintenance inspection and accident treatment of the heat exchanger can be effected while maintaining the rated heat exchange capacity.

DESCRIPTION OF THE PREFERRED EMBODIMENT

Figure 1:
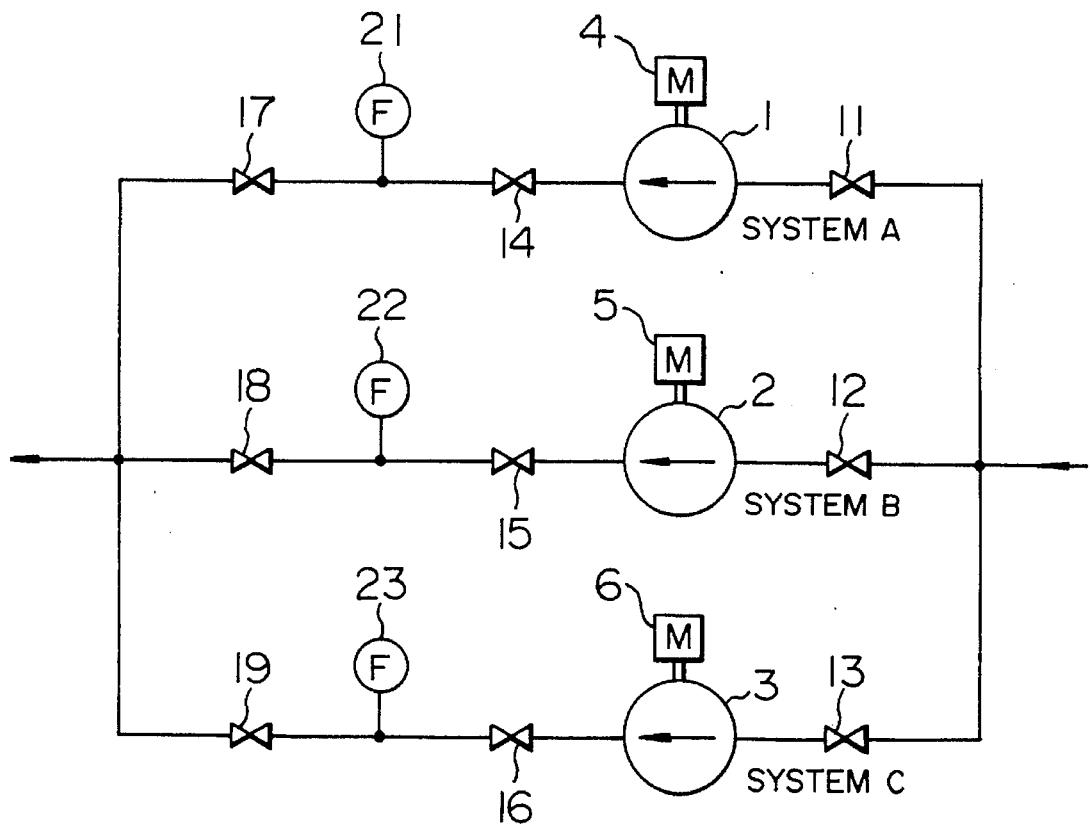
FIG. 1 is a system diagram showing a normal operation condition of a fluid plant according to a first embodiment of the present invention.
Figure 4:
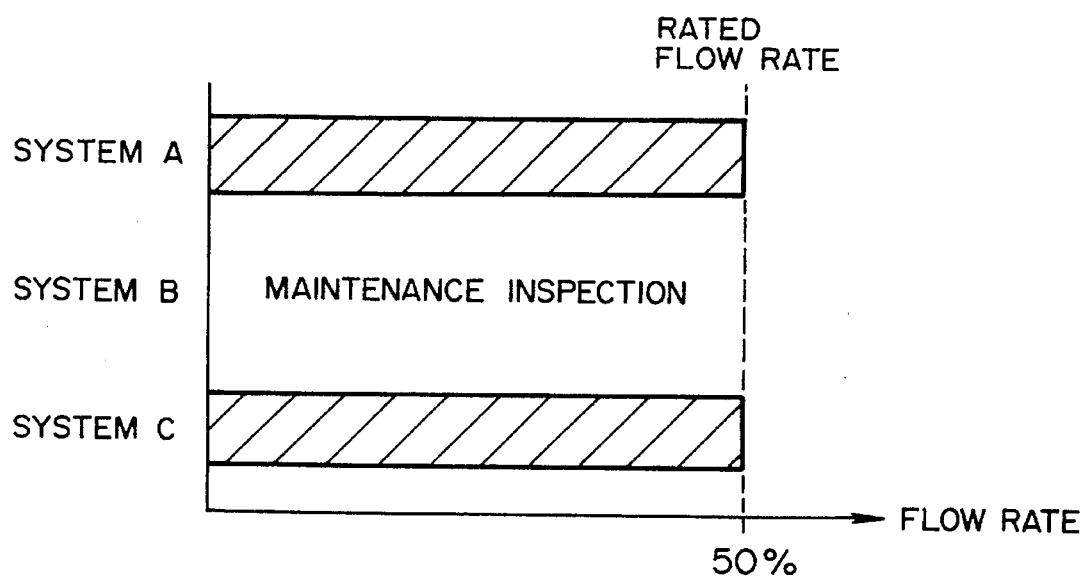
FIG. 4 is a graph showing capacities of the pumps in the respective systems shown in FIG. 3 during non-normal operation.
Figure 5:
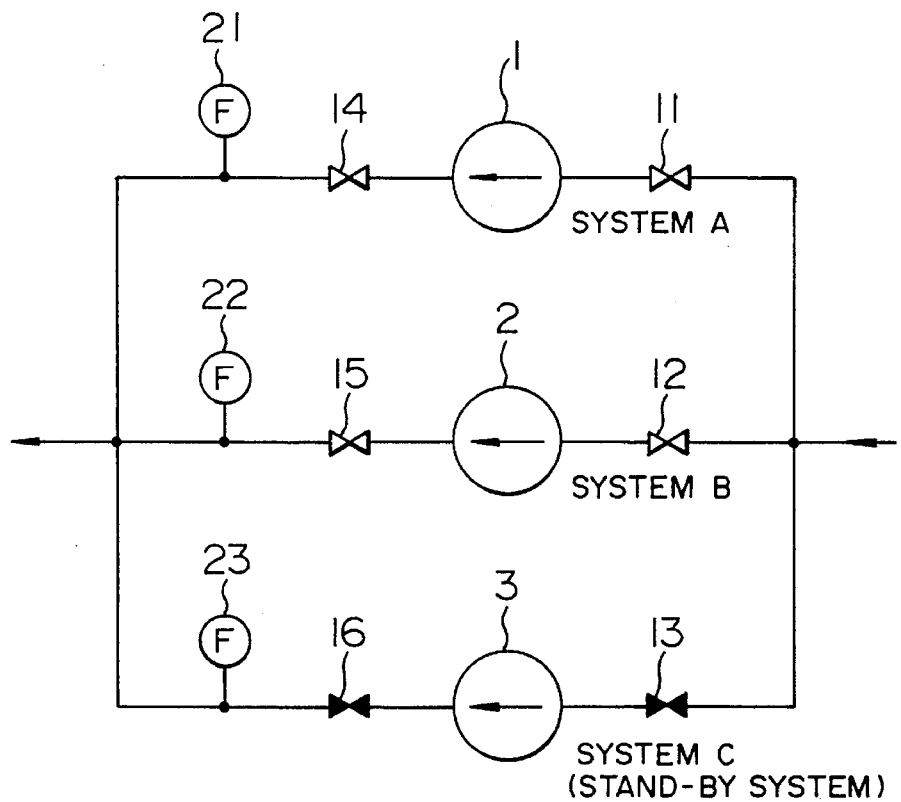
FIG. 5 is a system diagram showing a normal operation condition of a fluid plant according to a conventional example.
Figure 6:
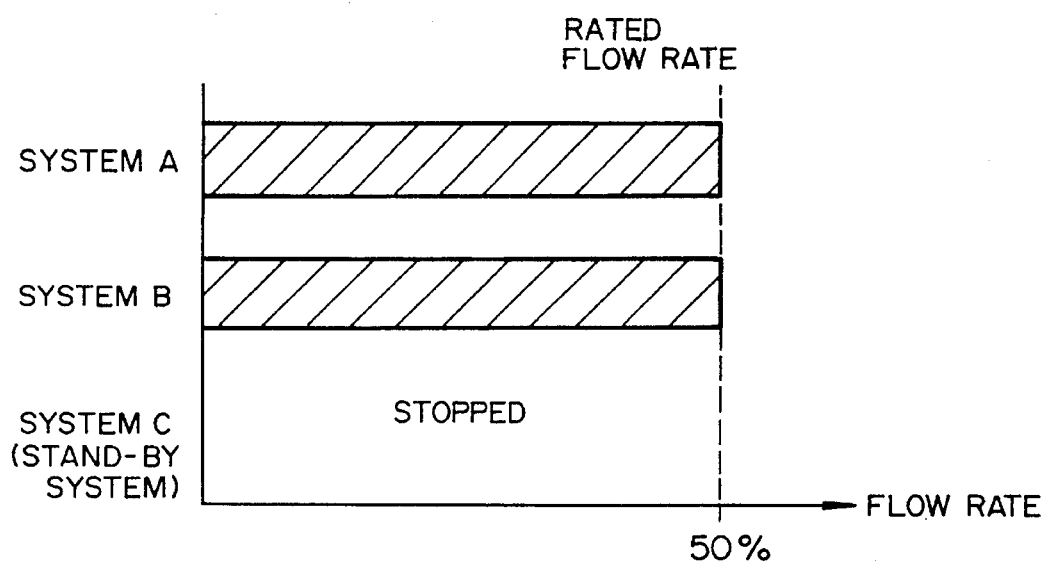
FIG. 6 is a graph showing capacities of pumps in the respective systems shown in FIG. 5 during normal operation.

A first embodiment of circulating pumps according to the present invention will be hereinafter described with reference to FIGS. 1, 4. As shown in FIG. 1, the targeted equipment comprises three systems of circulating pumps 1 to 3, each system having a capacity which is 50% of that of the whole equipment. The pumps 1 to 3 are driven by electric motors 4 to 6. Stop valves 11 to 16 serving as isolating means are provided on the upstream and downstream sides of the pumps 1 to 3. Flow Control valves 17 to 19, and flow meters 21 to 23 for measuring discharged flow rates of the pumps 1 to 3 are provided on the downstream side of the stop valves 14 to 16. Also, as shown in FIG. 7, this equipment includes a pump flow control system in which process signals from the flow meters 21 to 23, predetermined values of flow rates of the respective systems and signals indicating requirement of the inspection are inputted, and control devices for controlling rotational speeds of the pumps of the respective systems and opening degrees of valves in response to output signals from the pump flow control system.

Figure 2:
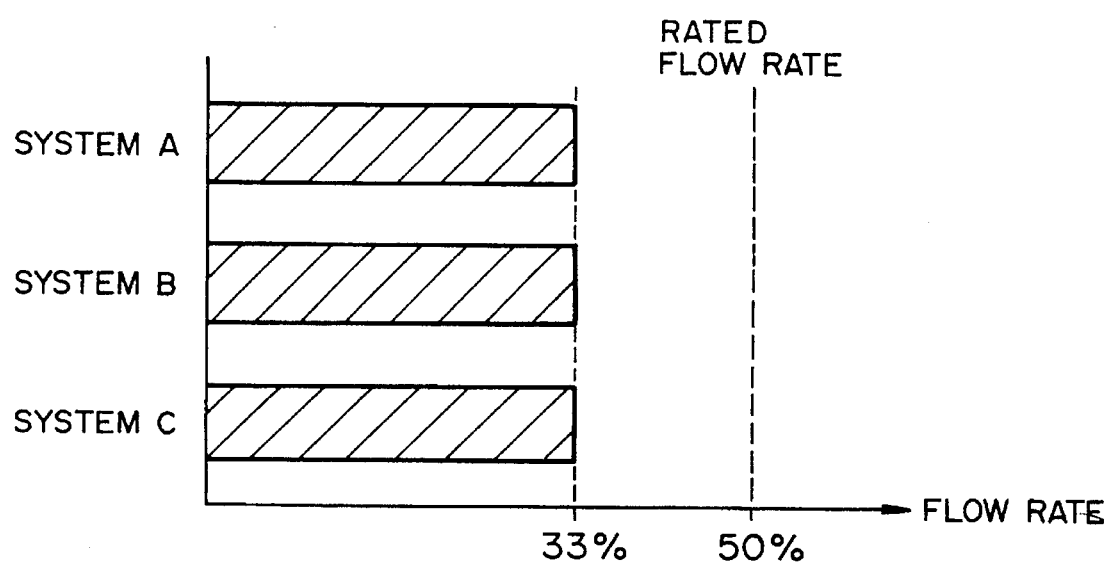
FIG. 2 is a graph showing capacities of pumps in the respective systems shown in FIG. 1 during normal operation.
Figure 3:
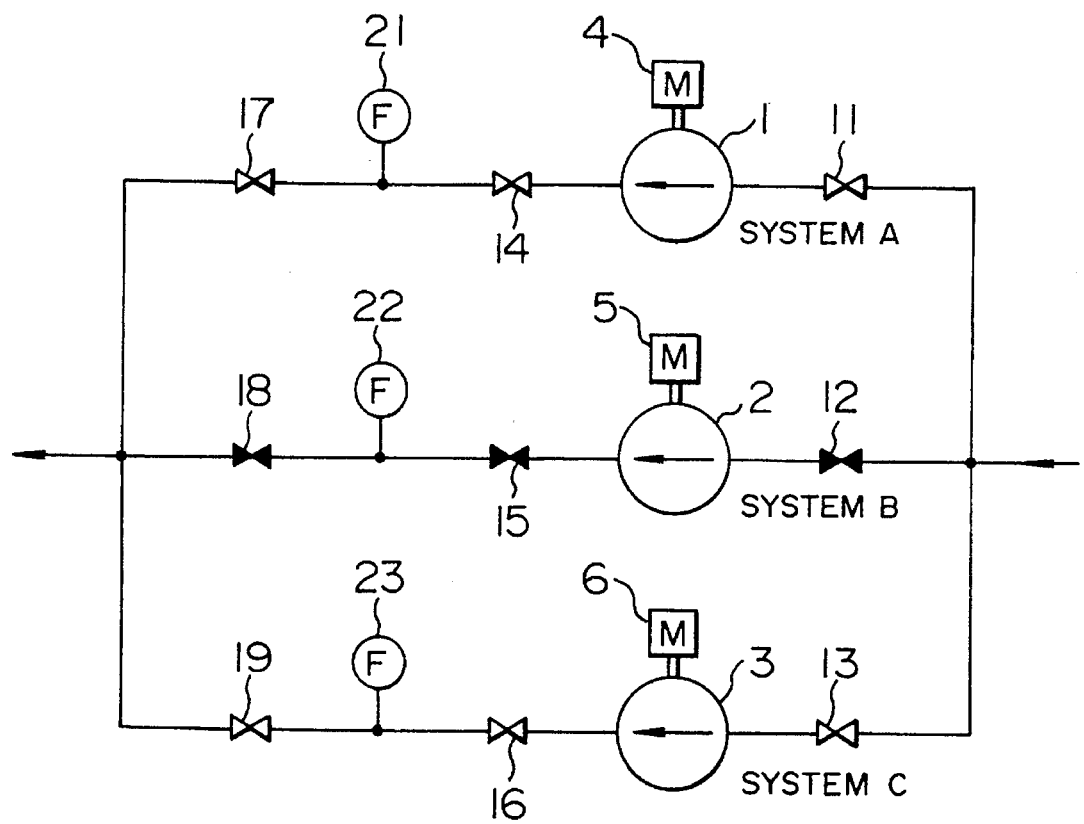
FIG. 3 is a system diagram showing a non-normal operation condition of the fluid plant according to the first embodiment of the invention.
Figure 8:
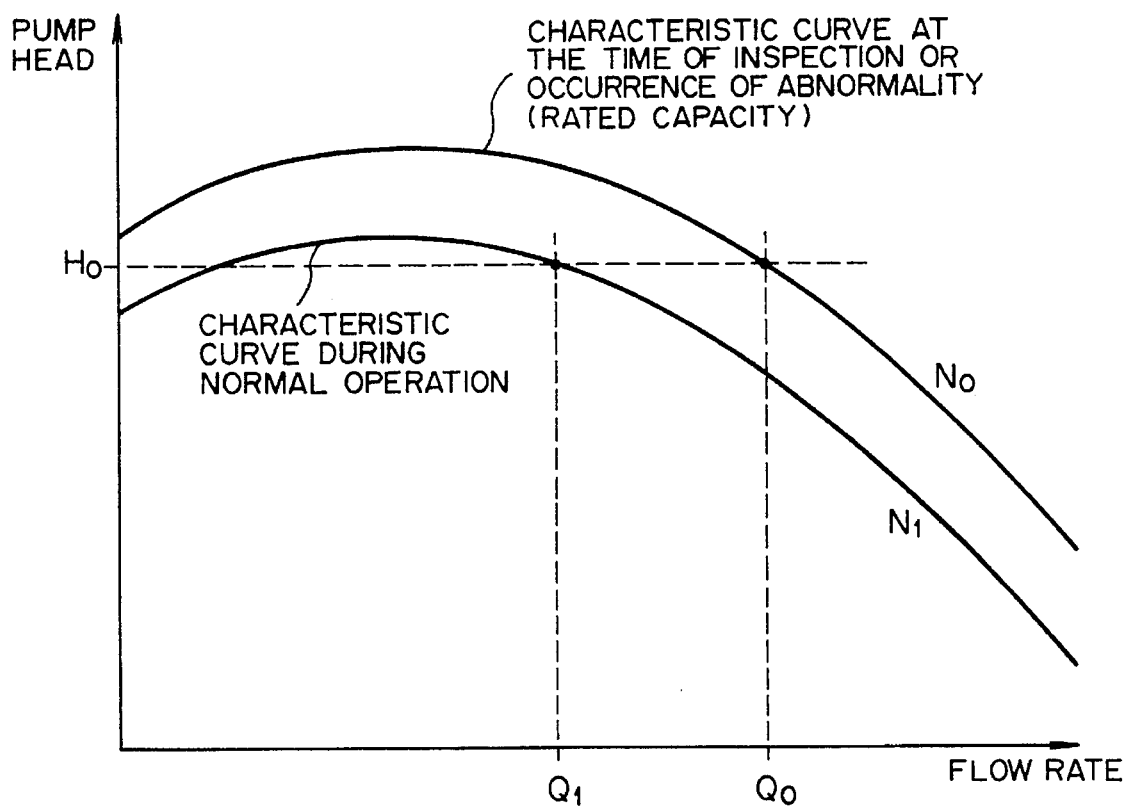
FIG. 8 is a chart with flow rate-pump head characteristic curves of a pump employed in each system of the fluid plant according to the first embodiment of the invention.

FIG. 2 shows flow rates of the respective systems during normal operation. This embodiment is different from the conventional equipment including apparatus of a stand-by system in that the flow rate of each system is decreased from 50%, which is a rated capacity of the pump, to 33%, and that all the three systems are operated at the same flow rate. FIG. 8 shows pump head-flow rate characteristic curves of each system. When each pump is operated at the rated capacity which is 50%, a rated pump head $H_0$ and a rated flow rate $Q_0$ can be obtained by increasing a rotational speed of the pump to a rated rotational speed $N_0$. During normal operation of this equipment, however, the pump rotational speed is decreased to $N_1$, and an opening degree of the flow control valve is regulated so as to operate the pump at a flow rate $Q_1$ which corresponds to the 33% capacity without changing a pump head $H_0$. The rotational speed $N_1$ at this time is about 90% of the rated rotational speed $N_0$, and causes no problem in operation of the pump.

Figure 7:
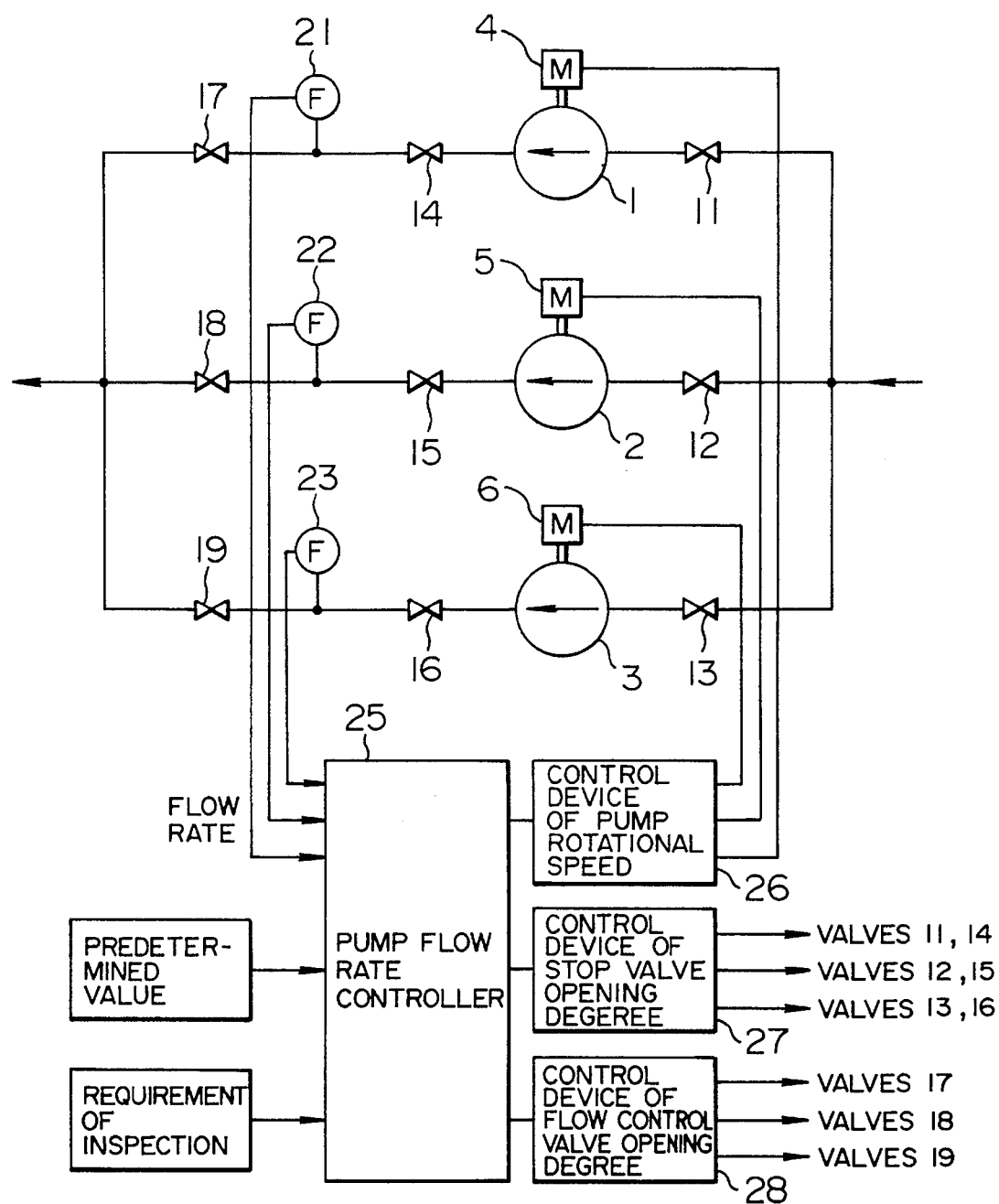
FIG. 7 is a block diagram showing a control system of the fluid plant according to the first embodiment of the invention.
Figure 9:
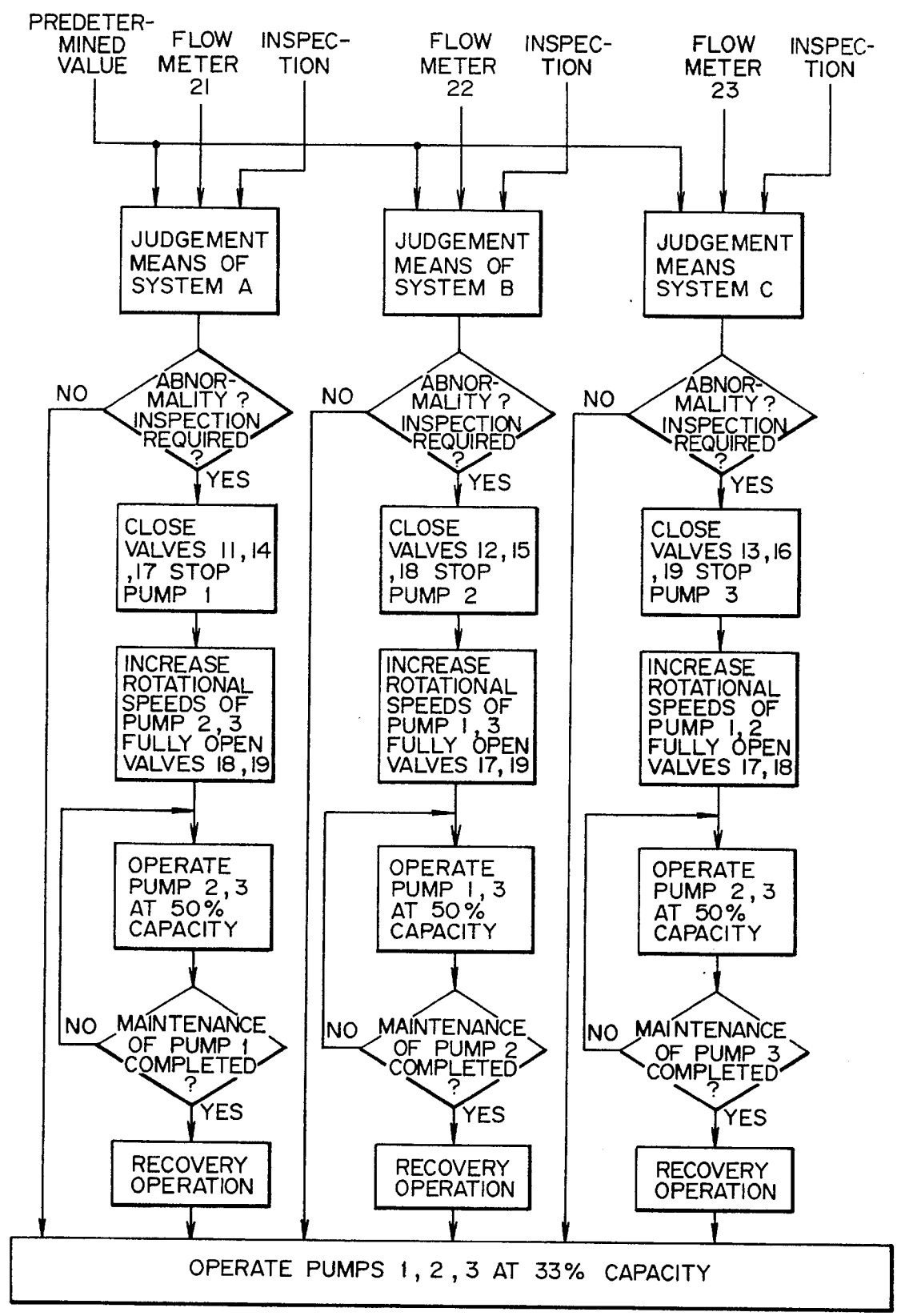
FIG. 9 is a control logic diagram of the fluid plant according to the first embodiment of the invention.

During normal operation, when one system is inspected regularly as a result of judgement by an operator of the plant equipment, or when an abnormal state is caused in the pump of one system for some reason, the capacity of the pump or operations of the valves in the system are changed by switching the systems according to a control method illustrated in FIG. 9 through a pump flow rate controller 25, a control device 26 of the pump rotational speed, a control device 27 of the stop valve opening degree and a control device 28 of the flow control valve opening degree, which are shown in FIG. 7. In the pump flow rate controller 25, an inspection signal from each system is inputted as information indicating requirement of the inspection on the basis of the judgement by the plant operator, and flow rate signals from the flow meters 21, 22, 23 and the predetermined values of flow rates are inputted as information indicating requirement of the inspection. By comparing the signals indicating requirement of the inspection, the flow rate signals and the predetermined values, the pump flow rate controller 25 judges whether an abnormal state is caused or not. During normal operation, when the pump flow rate controller 25 judges that the inspection is unnecessary, or that there is no abnormal state, the pumps of the three systems are kept operated at the 33% capacity.

On the other hand, when a signal for inspecting the pump 2 (the system B) during normal operation is transmitted by the operator, or when generation of an abnormal state is detected during judging process of the system B after comparing the flow rate signal of the flow meter 22 with the predetermined flow rate value, signals are transmitted from the pump flow rate controller 25 to the control device 27 of the stop valve opening degree and the control device 28 of the flow control valve opening degree, and consequently, the stop valves 12, 15 and the flow control valve 18 are closed to isolate the system B. Also, a signal is transmitted from the pump flow rate controller 25 to the control device 26 of the pump rotational speed so as to decrease the rotational speed of the electric motor 5, and thus, operation of the pump 2 is stopped.

Subsequently, on the basis of the signal from the pump flow rate controller 25, rotational speeds of the electric motors 4 and 6 of the systems A and C are increased to the rated rotational speed No shown in FIG. 8 by the control device 26 of the pump rotational speed, and also, the flow control valves 17 and 19 are fully opened by the control device 28 of the flow control valve opening degree. As a result, the pumps 1 and 3 can be operated at a flow rate of 50% which is the rated capacity. By continuing the operation of 50% capacity ×two systems (the systems A and C), maintenance inspection of the isolated pump 2 can be carried out while maintaining the capacity required as the plant. After maintenance inspection of the pump 2 is finished, the pump 2 is restarted and increased in capacity to 33% by the control device 26 of the pump rotational speed, and the valves 12, 15 and 18 in the system B are opened by the control device 27 of the stop valve opening degree and the control device 28 of the flow control valve opening degree. Thereafter, in relation to the pumps 1 and 3, the pump rotational speeds and the opening degrees of the flow control valves are controlled so that the pumps recover the initial capacities of 33%. Then, the operation of 33% capacity ×three systems is resumed and continued. Similarly, when the pump in the system A or C is inspected, or when an abnormal state is caused in it, the valves are operated, and the pump capacities are changed in accordance with the contents of FIG. 9. Thus, inspection can be conducted and measures against abnormality can be taken while maintaining the required capacity.

When an abnormal state is caused in one of the systems, operating conditions of the other two systems must be changed. In such a case, a control amount from the pump rotational speed $N_1$ of the 33% capacity to the rated rotational speed $N_0$ of the 50% capacity is small, as shown in FIG. 8, and the capacities of the other two systems are equal. Consequently, the apparatus capacities can be changed by the control method illustrated in FIG. 9. Owing to simplification of this control method, time for changing the capacities can be shortened, and the rated operational capacity of the equipment can be obtained quickly. Therefore, influences of an abnormal phenomenon can be suppressed to thereby improve safety of the equipment.

In the first embodiment, all the three systems have the same 33% capacity during normal operation, and at the time of inspection of one system or occurrence of an abnormal state, rotational speeds of the pumps 1 to 3 are controlled to cause these pumps to have the rated 50% capacity. However, in a modified embodiment of the first embodiment in which centrifugal pumps are employed as the pumps 1 to 3, rotational speeds of the pumps 1 to 3 are kept constant at the rated rotational speed, and opening degrees of the flow control valves 17 to 19 are regulated, so that the operation as an equipment can be effected even if capacities of the systems are not the same. For instance, during normal operation, the pumps 1 and 2 can have a 40% capacity whereas the pump 3 has a 20% capacity. With such a system structure, when the pump 2 is inspected or when an abnormal state is caused in it, flow rates of 50% which is the rated capacity can be obtained merely by fully opening the flow control valves 17 and 19. Thus, since time for changing the capacities can be shortened, influences of an abnormal phenomenon can be suppressed to thereby improve safety of the equipment.

Moreover, during normal operation, the apparatus of the systems are set at capacities below the rated capacities and operated moderately, and consequently, durabilities of the apparatus can be lengthened, thus improving the reliability of the equipment.

Figure 10:
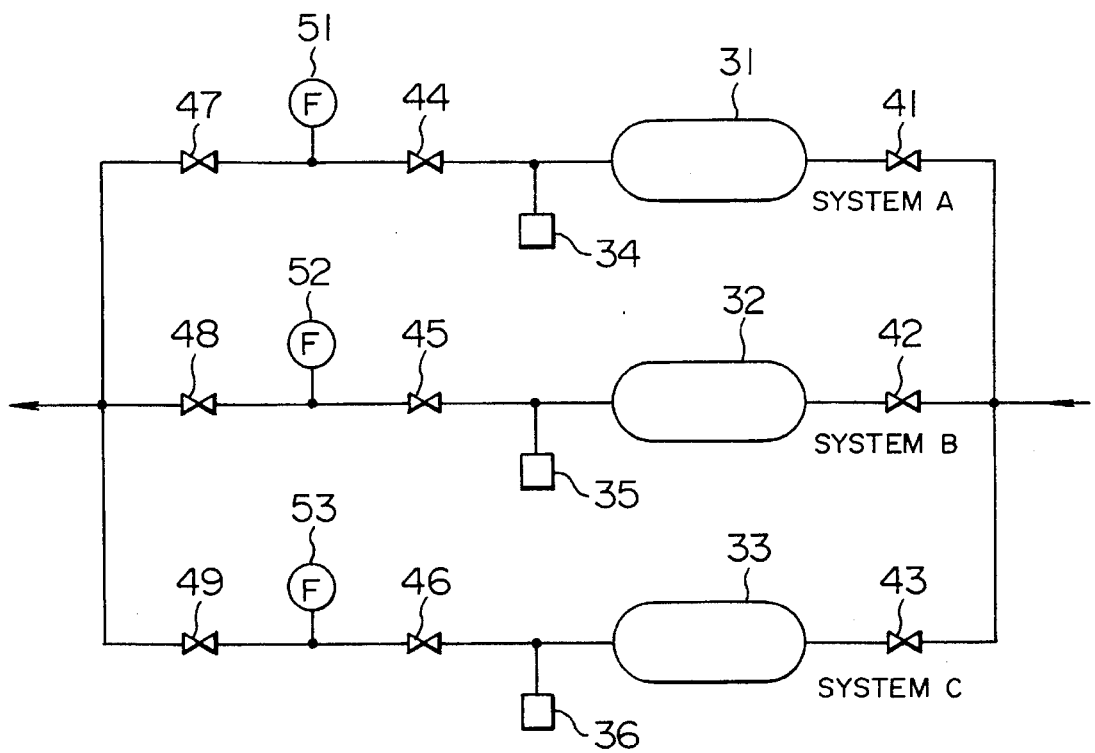
FIG. 10 is a system diagram showing a normal operation condition of a fluid plant according to a second embodiment of the invention.

A second embodiment of the present invention will now be described with reference to FIGS. 10, 11 and 12. In this embodiment, the invention is applied to filter demineralizer devices used in a reactor water clean-up system or the like for maintaining the purity (an electric conductivity, a chloric ione concentration, a pH value) of the coolant. As shown in FIG. 10, the targeted equipment is constituted of three systems A, B and C of filter demineralizer devices 31 to 33, each system having a coolant processing capacity which is 50% of that of the whole equipment. Purity detectors 34 to 36 for analyzing outlet water of the filter demineralizer devices 31 to 33 are provided on the downstream side of the filter demineralizer devices 31 to 33, so as to check the function of resin for filter demineralization. Stop valves 41 to 46 are provided on the upstream and downstream sides of the filter demineralizer devices 31 to 33. Flow control valves 47 to 49, and flow meters 51 to 53 for measuring coolant flow rates of the respective systems are provided on the downstream side of the stop valves 44 to 46. Also, as shown in FIG. 12, this equipment includes a flow rate controller 55 for the filter demineralizer devices in which signals from the flow meters 51 to 53, signals from the purity detectors 34 to 36, predetermined values of purities of the respective systems and signals indicating requirement of the inspection are inputted, and a control device 57 of the stop valve opening degree and a control device 58 of the flow control valve opening degree for controlling opening degrees of the valves of the respective systems in response to output signals from the flow rate controller.

Figure 11:
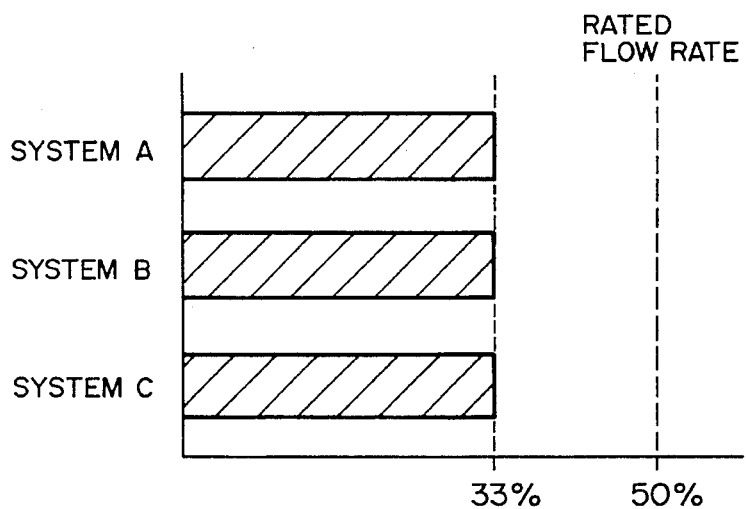
FIG. 11 is a graph showing capacities of pumps in the respective systems shown in FIG. 10 during normal operation.

FIG. 11 shows coolant flow rates of the respective systems during normal operation. By controlling the opening degrees of the flow control valves 47 to 49, the coolant flow rates of the respective systems are decreased from 50%, which is a rated processing capacity of the filter demineralizer devices 31 to 33, to 33%, and all the three systems are operated at the same flow rate (33% capacity).

Figure 12:
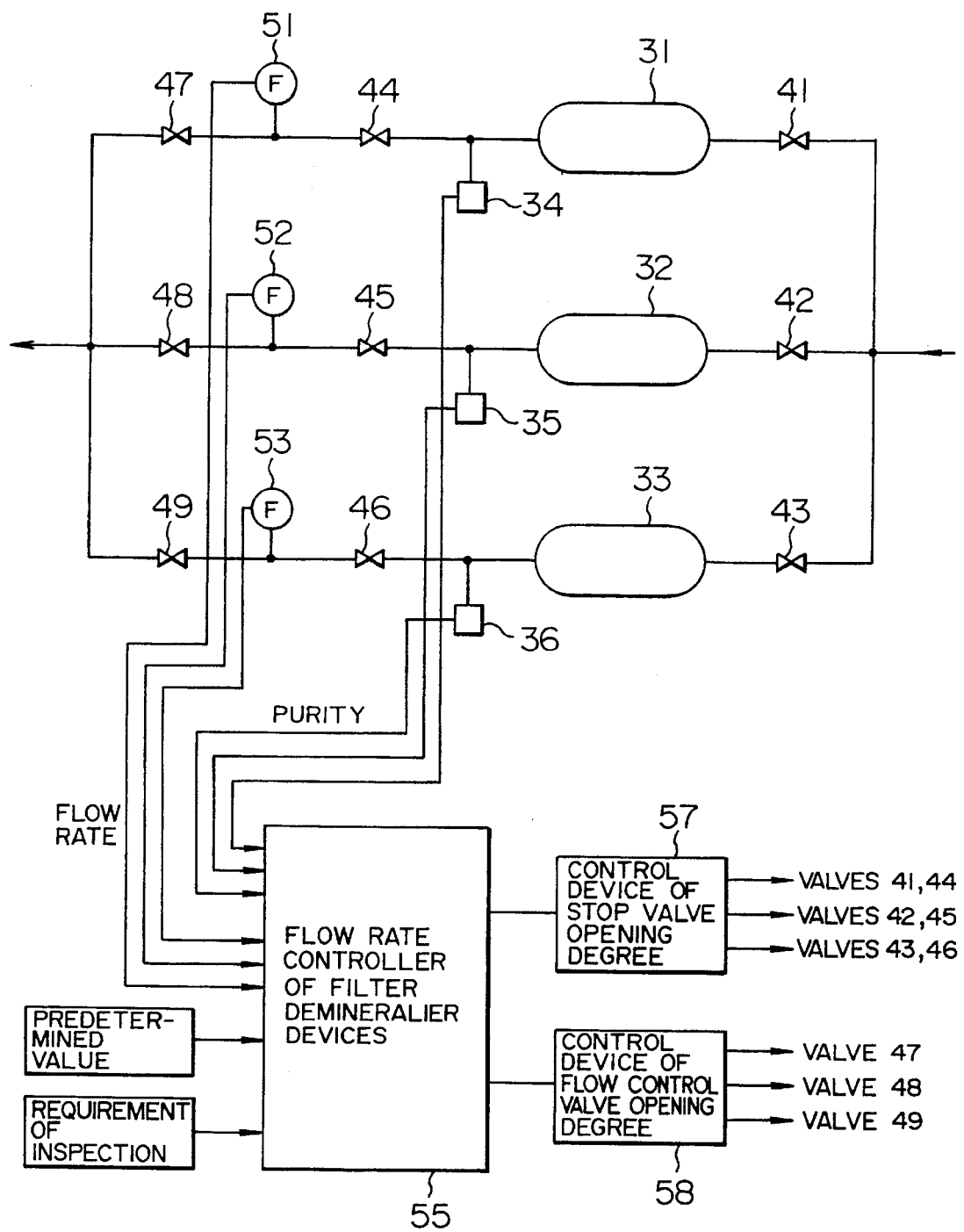
FIG. 12 is a block diagram showing a control system of the fluid plant according to the second embodiment of the invention.

During normal operation, when one system is inspected as a result of judgement by the operator, or when a deterioration of the function of the filter demineralizer device is detected in one of the systems by comparing signals from the purity detectors 34 to 36 with the predetermined values of purities, the system structure is changed through the control system illustrated in FIG. 12. In substantially the same manner as the above-described embodiment applied to the pumps, when the filter demineralizer device 32 of the system B is inspected, or when the flow rate controller 55 detects a deterioration of the filter demineralization function in response to a signal from the purity detector 35, the stop valves 42, 45 and the flow control valve 48 in the system. B are closed by the control device 57 of the stop valve opening degree and the control device 58 of the flow control valve opening degree, so as to isolate the system B.

Subsequently, the flow control valves 47 and 49 of the other two systems are fully opened by the control device 58 of the flow control valve opening degree. As a result the filter demineralizer devices 31 and 33 can be operated at a flow rate of 50% which is the rated capacity for coolant processing. While continuing the operation of 50% capacity×two systems (the systems A and C), maintenance inspection of the filter demineralizer device 32 can be carried out. After maintenance inspection of the filter demineralizer device 32 is finished,, the valves 42, 45 and 48 in the system B are opened by the control device 57 of the stop valve opening degree and the control device 58 of the flow control valve opening degree, thereby increasing the coolant flow rate to 33%. Also, by controlling the flow control valves 48 and 49 of the other two systems, the operation of 33% capacity× three systems is resumed.

In this embodiment, as described above, the equipment comprises the three systems of filter demineralizer devices each having a rated processing capacity of 50%, and the control system which can switch the systems and can change their capacities, and all the three systems are operated at the 33% capacity below the rated capacity in substantially the same manner as the above-described first embodiment applied to the pumps. Therefore, maintenance inspection of the filter demineralizer device can be performed in conditions of normal operation, to thereby improve the operational efficiency of the equipment. Moreover, when the purity of coolant in one of the systems is deteriorated, the capacities can be changed merely by isolating this system and controlling the opening degrees of the flow control valves in the other two systems. In consequence, the rated operational capacity of the equipment can be obtained quickly, and influences of the abnormal phenomenon can be suppressed, thus improving safety of the equipment. Furthermore, in substantially the same manner as the above-described embodiment applied to the pumps, the apparatus are set at capacities below the rated capacity and operated moderately during normal operation, and consequently, durabilities of the apparatus can be lengthened, thus improving the reliability of the equipment.

Figure 13:
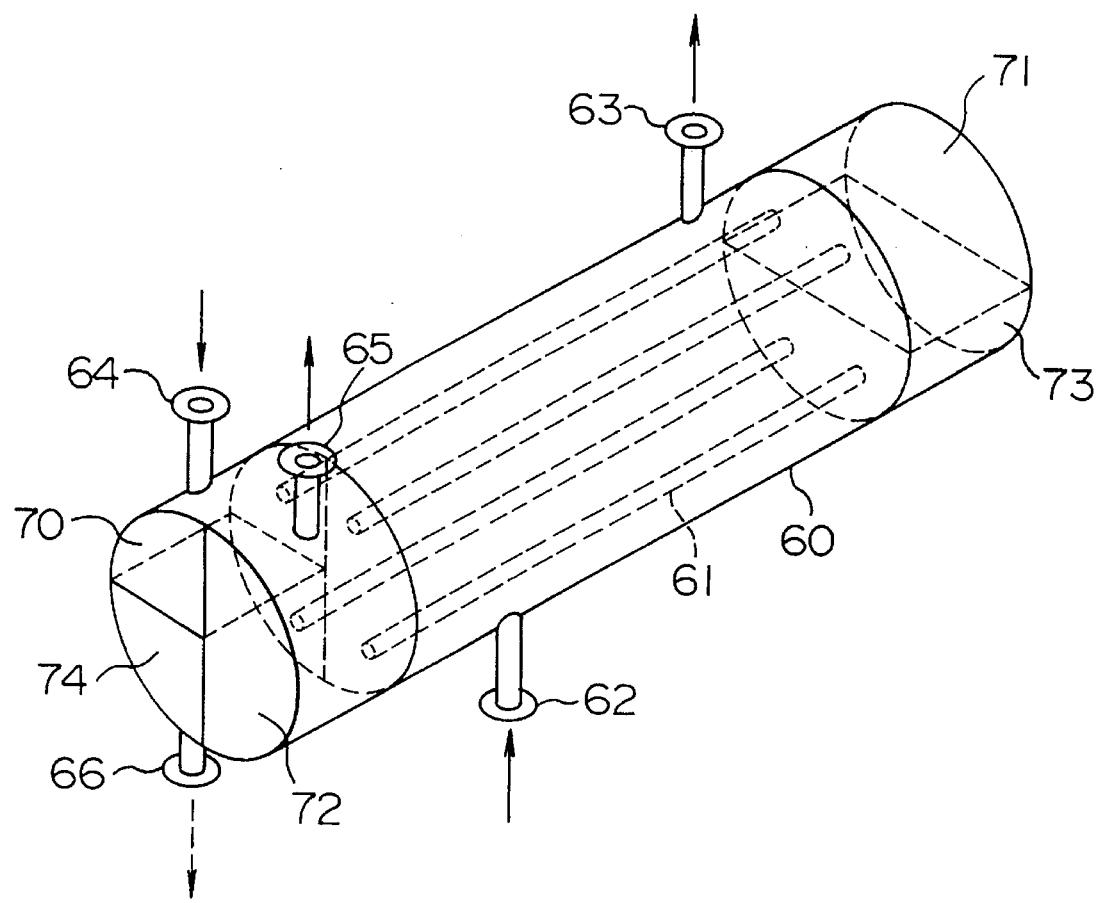
FIG. 13 is a perspective view showing a heat exchanger employed in each system of a fluid plant according to a third embodiment of the invention.

A third embodiment of the present invention will now be described with reference to FIGS. 13, 14 and 15. In this embodiment, the invention is applied to heat exchangers of a structure having one shell-side path and four tube-side paths, which are used in a reactor building closed cooling water system or the like. FIG. 13 schematically shows the structure of a heat exchanger 60 employed in this embodiment. A fluid to flow in the shell side of the heat exchanger 60 enters from a nozzle 62, exchanges heat with a tube side fluid flowing in a large number of heat transfer tubes 61, and is discharged from a nozzle 63. In an ordinary heat exchanger of the structure having one shell-side path and four tube-side paths, a tube side fluid enters from a nozzle 64 provided on a header 70, turns reversely in headers 71, 72 and 73, and is discharged from a nozzle 66 provided on a header 74. In this embodiment, a nozzle 65 is additionally provided on the header 72.

Figure 14:
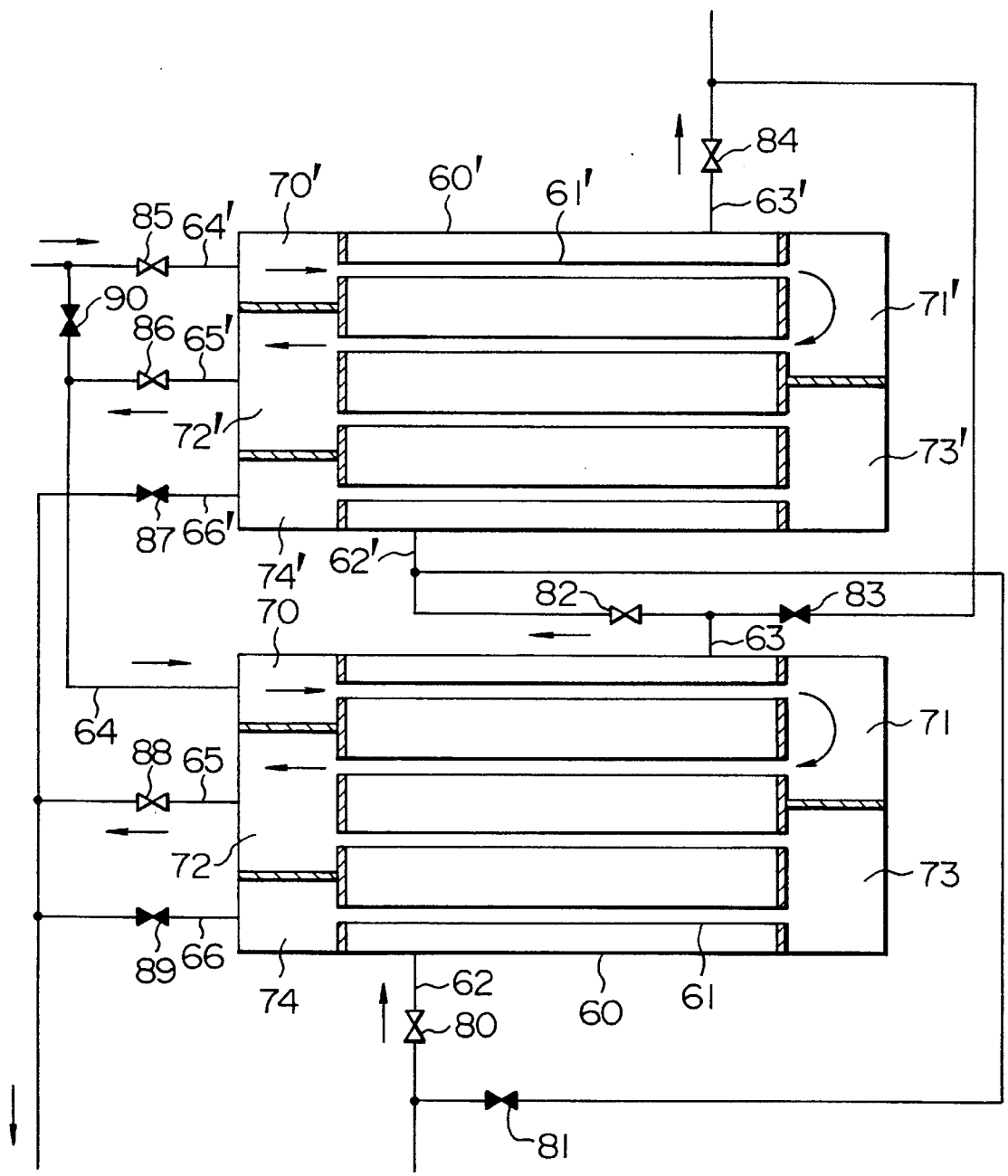
FIG. 14 is a system diagram showing a normal operation condition of the fluid plant according to the third embodiment of the invention.

As shown in FIG. 14, the targeted equipment of this embodiment is constituted of two systems of heat exchangers 60 shown in FIG. 13 which are provided in series. Each of the two heat exchangers 60 and 60' is of the structure comprising four tube-side paths and has a heat transfer area which corresponds to 100% of an amount of heat exchange required as an equipment. Valves 80 to 90 are provided on outlet and inlet portions of nozzles 62 to 66 and 62' to 66' of the heat exchangers 60 and 60', and these valves are opened and closed by a control device (not shown). The outlet and inlet nozzle portions of the heat exchangers are designed to have means for measuring temperatures and flow rates of the fluid (not shown) so as to supply input information to the control device.

FIG. 14 illustrates flow courses of the shell-side fluid and the tube-side fluid during normal operation. First, the tube-side fluid enters from a nozzle 64' provided on a header 70' of the heat exchanger 60', passes through a heat transfer tube 61', turns reversely inside of a header 71' and flows toward a header 72'. It is different from the conventional heat exchanger in that a valve 87 provided on an outlet portion of a nozzle 66' is closed, and that a valve 86 provided on an outlet portion of a nozzle 65' is opened, so that the tube-side fluid flows into the heat exchanger 60 through a nozzle 64 without flowing from the header 72' into headers 73' and 74'. Therefore, the heat exchanger 60' is changed into a structure comprising two tube-side paths from the header 70' to the header 71' and from the header 71' to the header 2' and its effective heat transfer area becomes 50% of the rated area. Similarly, the heat exchanger 60 is changed into a structure comprising two tube-side paths by opening a valve 88 and closing a valve 89, and consequently, its effective heat transfer area becomes 50% of the rated area.

On the other hand, the shell-side fluid enters from a nozzle 62 of the heat exchanger 60, exchanges heat with the tube-side fluid, and is discharged from a nozzle 63. However, an amount of this heat exchange is 50% of the rated amount because heat transfer surfaces of two paths from a header 72 to a header 74 does not function effectively. Thereafter, the shell-side fluid enters the heat exchanger 60' from a nozzle 62', conducts heat exchange whose amount is 50% of the rated amount again, and is discharged from a nozzle 63'. In this embodiment, therefore, each of the heat exchangers 60 and 60' which has the rated 100% heat transfer area, is changed to have 50% of the rated heat transfer area by discharging the tube-side fluid from the nozzle 65, 65' provided on the header 72, 72' during normal operation, so that this embodiment will have a structure of 50% capacity×two systems.

Figure 15:
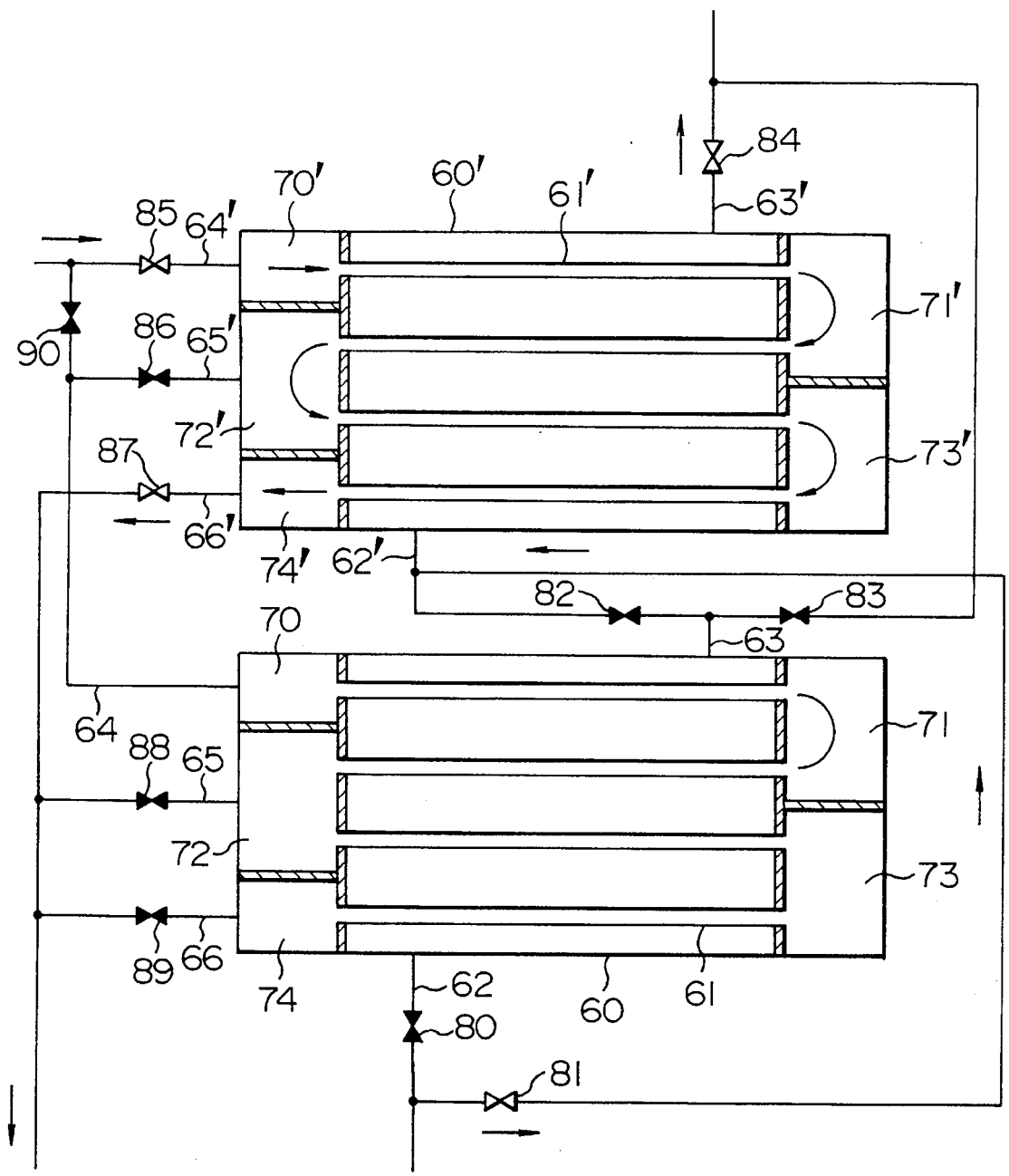
FIG. 15 is a system diagram showing one non-normal operation condition of the fluid plant according to the third embodiment of the invention.
Figure 16:
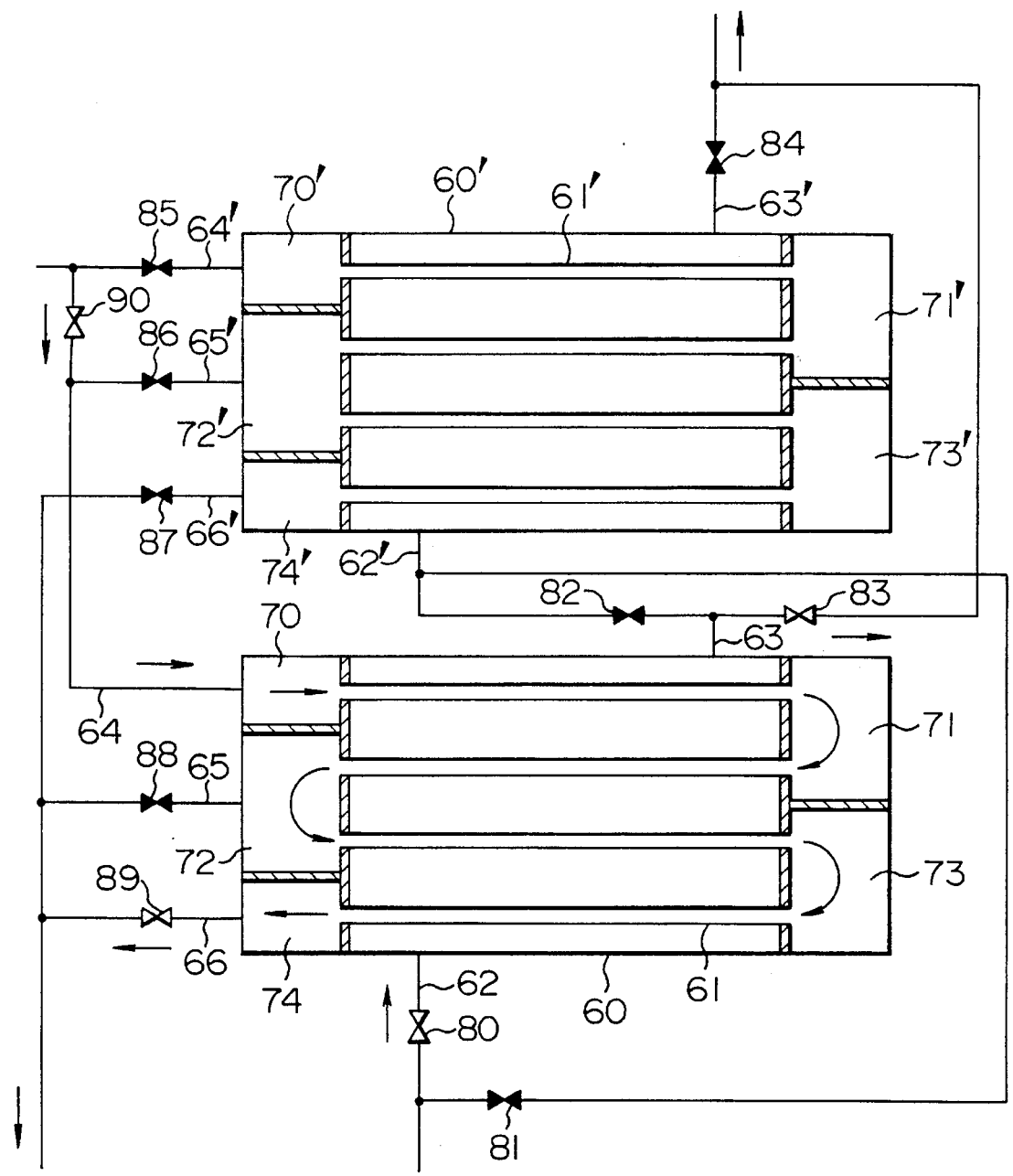
FIG. 16 is a system diagram showing another non-normal operation condition of the fluid plant according to the third embodiment of the invention.

Next, during normal operation, when one system is inspected as a result of judgement by the operator, or when an abnormal state is caused in one system due to a breakage of the heat transfer tube 61 or the like, the system structure is changed through the control devices, as shown in FIGS. 15 and 16. For instance, when the heat exchanger 60 is inspected during normal operation, or when occurrence of an abnormality in the heat exchanger 60 is detected from measuring results of outlet and inlet temperatures and flow rates of the fluid, the valves 80, 82, 83, 88, 89 and 90 connected to the heat exchanger 60 are closed to isolate the system, as shown in FIG. 15. Subsequently, of the valves connected to the heat exchanger 60', the valves 81 and 7 are opened, and the valve 86 is closed. As a result, the heat exchanger 60' can be changed to have a structure comprising four tube-side paths, and the rated 100% heat transfer area can be obtained.

Similarly, for the purpose of maintenance of the heat exchanger 60', the valves 82, 84, 85, 86 and 87 are closed to isolate the system, as shown in FIG. 16. Subsequently, the valves 83, 89 and 90 are opened, and the valve 88 is closed, so that the heat exchanger 60 can be changed to have a structure comprising four tube-side paths, and that the rated 100% heat transfer area can be obtained.

In this embodiment, as described above, the equipment comprises the two systems of heat exchangers each having a heat exchange amount of the rated 100% capacity, and the control system which can switch the systems and can change their capacities. During normal operation, the fluid is discharged from the nozzles provided on the headers between two tube-side path and three tube-side path, in both of the systems, so that each of the heat exchangers is changed to have 50% of the rated heat transfer area, to thereby operate the equipment with the structure of 50% capacity×two systems. In consequence, while heat exchange of the rated amount as an equipment is effected in one of the systems, the maintenance inspection of the heat exchanger in the other system can be performed, thus improving operational efficiency of the equipment. Moreover, when an abnormal state is caused in one system, the capacities of the systems can be changed by switching operations of the valves. Thus, the rated heat exchange amount of the equipment can be obtained quickly, and influences of the abnormal phenomenon can be suppressed, thus improving safety of the equipment. Furthermore, in substantially the same manner as the above-described pumps and filter demineralizer devices, the apparatus are set at capacities below the rated capacity and operated moderately during normal operation, and consequently, durabilities of the apparatus can be lengthened, thus improving the reliability of the equipment.

It should be noted that the present invention can also be applied to nuclear power plants in addition to a boiling water reactor, and thermal power plants.

What is claimed is:

1. A fluid plant comprising a plurality of systems which are all operated at capacities less than a rated capacity during normal operation, switching means for changing desired systems of said plurality of systems to be operated at the rated capacity, isolating means for isolating said desired systems of the plurality of systems from systems to be inspected, judgement means which information based on signals indicating requirement of inspection of apparatus is inputted to judge whether a command of inspection has been issued or not in each system, and a flow rate controller which transmits control signal, on the basis of information from said judgement means, to control devices for controlling operations of apparatus in each system, said control signals serving to operate said isolating means, such that a system to be inspected is isolated, and such that capacities of the desired systems, which have been operated at less than the rated capacity, are increased so that the desired systems operate at the rated capacity.

2. A fluid plant comprising a plurality of systems (N+1), each having a rated capacity which is substantially 1/N of a capacity required as a whole, isolating means for each of the systems, and control means for controlling each of the plurality of systems (N+1) to be operated at a capacity less than the rated capacity during normal operation, and controlling N of the systems to be operated at the rated capacity during non-normal operation and changing the capacity of the one other system to be zero, wherein said control means comprise first judgement means in which information based on signals indicating requirement of inspection of apparatus is inputted to judge whether a command of inspection has been issued or not in each system, and a first flow rate controller which transmits first control signals, on the basis of information from said first judgement means, to control devices for controlling operations of apparatus in each system, said first control signals serving to operate said isolating means of a system to be inspected in isolating directions, to change the capacity of the system to be inspected to be zero, and to increase the capacities of the other systems, which have been less than the rated capacity, to the rated capacity.

3. A fluid plant according to claim 2, wherein said control means also comprise process amount observation means provided in each system, second judgement means in which information based on process signals from said process amount observation means is inputted to judge whether an abnormality has occurred or not in each system, and a second flow rate controller which transmits second control signals, on the basis of information from said second judgement means, to control devices for controlling operations of apparatus in each system, said second control signals serving to operate said isolating means of an abnormal system in isolating directions, to change the capacity of the abnormal system to be zero, and to increase the capacities of the other systems, which have been less than the rated capacity, to the rated capacity.

4. A fluid plant according to claim 2, wherein apparatus in the systems comprises a plurality of heat exchangers, each having a structure comprising one shell-side flow path and a plurality of tube-side flow paths, said heat exchangers each including an outlet nozzle of a fluid on said tube side which is provided on a header in which a flow of the tube-side fluid turns reversely, an outlet nozzle of a header on the outlet side of said heat exchanger, and an inlet nozzle of a header of the inlet side of said heat exchanger, valves serving as isolating means which are provided in flow paths which are connected to nozzles of said plurality of heat exchangers, and other valves serving as isolating means which are provided in flow paths which are connected to fluid outlets and inlets of shell-side flow paths of said plurality of heat exchangers.

5. A fluid plant according to claim 4, including switching means for switching the valves so as to change flow of fluid through the plurality of heat exchangers.

6. A fluid plant according to claim 1, wherein said switching means includes means for changing capacities of said systems to be inspected to a zero capacity, and wherein said control signals serve to operate said isolating means to change the capacity of the systems to be inspected to be zero.

* * * * *